(12) United States Patent
Clare

(10) Patent No.: US 6,499,795 B2
(45) Date of Patent: Dec. 31, 2002

(54) VEHICLE WITH STORAGE/UTILITY SYSTEM

(76) Inventor: Scott Clare, 3381 Shown Ct., Hayward, CA (US) 94541

( * ) Notice: Subject to any disclaimer, the term of this patent is extended or adjusted under 35 U.S.C. 154(b) by 23 days.

(21) Appl. No.: 09/803,420

(22) Filed: Mar. 9, 2001

(65) Prior Publication Data

US 2001/0052714 A1 Dec. 20, 2001

Related U.S. Application Data

(63) Continuation-in-part of application No. 09/426,981, filed on Oct. 26, 1999, which is a continuation of application No. 08/896,392, filed on Jul. 18, 1997, now Pat. No. 5,979,973, which is a continuation-in-part of application No. 08/685,678, filed on Jul. 24, 1996, now abandoned, which is a continuation-in-part of application No. 08/506,893, filed on Jul. 26, 1995, now Pat. No. 5,567,000.

(51) Int. Cl.$^7$ .................................................. B60P 3/00
(52) U.S. Cl. ...................................... 296/183; 296/37.6
(58) Field of Search .............................. 296/37.6, 24.1, 296/183

(56) References Cited

U.S. PATENT DOCUMENTS

| | | | |
|---|---|---|---|
| 257,968 A | 5/1882 | Mossman | |
| 322,965 A | 7/1885 | Powell | |
| 527,339 A | 10/1894 | Lins | |
| 912,430 A | 2/1909 | Smither | |
| 1,295,372 A | 2/1919 | Riddle et al. | |
| 1,490,657 A | 4/1924 | Botella | |
| 1,990,757 A | 2/1935 | Stiles | |
| 2,159,022 A | * 5/1939 | Hawkins | 296/37.6 X |
| 2,327,410 A | 8/1943 | Ferguson | 211/13 |
| 2,380,557 A | 7/1945 | Terry | |
| D143,990 S | 2/1946 | Powers | |
| 2,426,772 A | 9/1947 | Holan, Jr. et al. | |
| 2,455,417 A | 12/1948 | Holan et al. | |
| 2,530,578 A | 11/1950 | Hotop | |
| 2,616,754 A | 11/1952 | Stahl | |

(List continued on next page.)

FOREIGN PATENT DOCUMENTS

| | | |
|---|---|---|
| CA | 551973 | 1/1958 |
| DE | 3636789 A1 | 5/1988 |
| DK | 13161 | 5/1910 |
| FR | 608961 | 8/1926 |
| FR | 716091 | 12/1931 |
| FR | 1181569 | 6/1959 |
| FR | 2592344 A | 7/1987 |
| GB | 207524 | 7/1924 |
| JP | 57151429 | 9/1982 |
| JP | 1119445 | 5/1989 |
| JP | 4248033 | 3/1992 |
| JP | 4221279 | 8/1992 |
| WO | WO 97/05008 | 2/1997 |

OTHER PUBLICATIONS

U.S. Patent Application Ser. No. 09/426,981.
U.S. Patent Application Ser. No. 09/512,018.
U.S. Patent Application Ser. No. 09/083,422.
Douglass, "A low silhouette," 1–3.

*Primary Examiner*—Dennis H. Pedder

(57) ABSTRACT

A pickup truck conversion and method of providing same involves a storage/utility system in any fleet side pickup truck bed without substantially altering the bed's external appearance. The storage system is located adjacent the wheel well sections of the bed, and uses hinges to open and close the fender (side panel) of the bed. Since the storage system does not substantially alter the truck's external appearance, it reduces the attraction for theft. Also, since the storage area does not extend inwardly beyond the conventional wheel wells, the storage system leaves most of the truck bed free for use.

50 Claims, 2 Drawing Sheets

U.S. PATENT DOCUMENTS

| | | |
|---|---|---|
| 2,622,400 A | 12/1952 | Greer |
| 2,662,793 A | 12/1953 | Lindsay |
| 2,722,352 A | 11/1955 | Dehnel |
| 2,722,913 A | 11/1955 | Holan et al. |
| 2,812,097 A | 11/1957 | Legge |
| 2,893,727 A | 7/1959 | Barnard |
| 2,901,285 A | 8/1959 | Walker |
| 2,941,837 A | 6/1960 | McCready |
| 2,978,153 A | 4/1961 | Brindle |
| 2,992,038 A | 7/1961 | Manganello |
| 3,019,047 A | 1/1962 | Ahrens |
| 3,022,108 A | 2/1962 | Cooley |
| 3,034,823 A | 5/1962 | Himka et al. |
| 3,068,038 A | 12/1962 | Douglass, Jr. |
| 3,082,033 A | 3/1963 | Bosher |
| 3,085,826 A | 4/1963 | Carreau |
| 3,245,713 A | 4/1966 | Ogilvie |
| 3,326,595 A | 6/1967 | Ogilvie |
| 3,449,864 A | 6/1969 | Prost-Dame et al. |
| 3,492,042 A | 1/1970 | Nachtigall, Jr. |
| 3,541,668 A | 11/1970 | Wessells, III et al. |
| 3,596,976 A | 8/1971 | Eitel et al. |
| 3,668,907 A | 6/1972 | Pastva, Jr. |
| 3,727,971 A | 4/1973 | Sisler |
| 3,768,858 A | 10/1973 | Boismier |
| 3,799,605 A | 3/1974 | Silva |
| 3,806,184 A | 4/1974 | Dean |
| 3,826,529 A | 7/1974 | Wood |
| 3,869,873 A | 3/1975 | Thomas |
| 3,891,262 A | 6/1975 | Brunel |
| 4,103,956 A | 8/1978 | Faulstich |
| 4,121,382 A | 10/1978 | Dietrich et al. |
| 4,126,349 A | 11/1978 | Nelson et al. |
| 4,135,761 A | 1/1979 | Ward |
| 4,138,046 A | 2/1979 | De Freze |
| 4,151,925 A | 5/1979 | Glassmeyer |
| 4,216,990 A | 8/1980 | Musgrove et al. |
| D257,968 S | 1/1981 | Rice |
| 4,353,111 A | 10/1982 | Gallitzendorfer et al. |
| 4,355,837 A | 10/1982 | Shimizu et al. |
| 4,372,429 A | 2/1983 | Marx |
| 4,394,100 A | 7/1983 | Sperlich |
| 4,408,751 A | 10/1983 | Dodson et al. |
| 4,422,685 A | 12/1983 | Bonfilio et al. |
| 4,438,964 A | 3/1984 | Peters |
| 4,469,364 A | 9/1984 | Rafi-Zadeh |
| 4,570,986 A | 2/1986 | Sams |
| 4,632,446 A | 12/1986 | Douglass |
| 4,643,314 A | 2/1987 | Kidd |
| 4,685,695 A | 8/1987 | LeVee |
| 4,705,317 A | 11/1987 | Henri |
| 4,733,898 A | 3/1988 | Williams |
| 4,761,917 A | 8/1988 | Knecht et al. |
| 4,762,449 A | 8/1988 | St. Pierre et al. |
| 4,770,458 A | 9/1988 | Burke et al. |
| 4,773,242 A | 9/1988 | Smith |
| 4,776,481 A | 10/1988 | Kidd |
| 4,789,195 A | 12/1988 | Fletcher |
| 4,805,347 A | 2/1989 | Smith |
| 4,823,923 A | 4/1989 | Moyer |
| 4,830,242 A | 5/1989 | Painter |
| 4,861,096 A | 8/1989 | Hastings |
| 4,900,083 A | 2/1990 | Kumasaka et al. |
| 4,911,487 A | 3/1990 | Rachocki |
| 4,917,279 A | 4/1990 | Brow et al. |
| 4,917,430 A | 4/1990 | Lawrence |
| 4,936,624 A | 6/1990 | West |
| 4,971,092 A | 11/1990 | Parry et al. |
| 4,981,320 A | 1/1991 | Bowman |
| 4,998,758 A | 3/1991 | Kowalczyk et al. |
| 5,048,888 A | 9/1991 | Willy et al. |
| 5,088,636 A | 2/1992 | Barajas |
| 5,090,105 A | 2/1992 | DeRees |
| 5,090,770 A | 2/1992 | Heinrichs et al. |
| 5,098,148 A | 3/1992 | Hoban |
| 5,123,691 A | 6/1992 | Ginn |
| 5,125,710 A | 6/1992 | Gianelo |
| 5,172,519 A | 12/1992 | Cooper |
| 5,190,337 A | 3/1993 | McDaniel |
| 5,197,775 A | 3/1993 | Reeber |
| 5,207,469 A | 5/1993 | Rossi |
| 5,233,849 A | 8/1993 | Forbers |
| 5,251,729 A | 10/1993 | Nehl et al. |
| 5,253,917 A | 10/1993 | Brueggemann |
| 5,267,773 A | 12/1993 | Kalis, Jr. et al. |
| 5,267,776 A | 12/1993 | Fromson |
| 5,288,124 A | 2/1994 | Ward |
| 5,303,969 A | 4/1994 | Simnacher |
| 5,316,358 A | 5/1994 | Payne et al. |
| 5,324,089 A | 6/1994 | Schlachter |
| 5,339,488 A | 8/1994 | Maass |
| 5,361,542 A | 11/1994 | Dettloff |
| 5,383,703 A | 1/1995 | Irvine, III |
| 5,385,378 A | 1/1995 | Hakamada et al. |
| 5,390,974 A | 2/1995 | Theodorakakos |
| 5,421,645 A | 6/1995 | Young |
| 5,439,152 A | 8/1995 | Campbell |
| 5,449,213 A | 9/1995 | Kiley et al. |
| 5,458,353 A | 10/1995 | Hanemaayer |
| 5,476,301 A | 12/1995 | Berkich |
| 5,489,104 A | 2/1996 | Wolff |
| 5,498,048 A | 3/1996 | Shelby, Jr. |
| 5,498,049 A | 3/1996 | Schlachter |
| 5,518,158 A | 5/1996 | Matlack |
| 5,535,931 A | 7/1996 | Barlow et al. |
| 5,567,000 A | 10/1996 | Clare ......................... 296/37.6 |
| 5,573,685 A | 11/1996 | Boncaldo .................... 219/201 |
| 5,575,525 A | 11/1996 | Walworth, Jr. et al. ..... 296/183 |
| 5,615,922 A | 4/1997 | Blanchard .................. 296/37.6 |
| 5,628,540 A | 5/1997 | James ........................... 296/3 |
| 5,636,890 A | 6/1997 | Cooper ..................... 296/37.1 |
| 5,660,427 A | 8/1997 | Freeman et al. |
| 5,667,268 A | 9/1997 | Bump |
| 5,709,309 A | 1/1998 | Gallagher et al. .......... 220/229 |
| 5,810,426 A | 9/1998 | Bovellan .................... 296/189 |
| 5,816,630 A | 10/1998 | Bennett et al. ........ 292/341.17 |
| 5,826,931 A | 10/1998 | Perlman et al. ............ 296/37.6 |
| 5,833,295 A | 11/1998 | Farlow, Jr. ................. 296/24.1 |
| 5,845,952 A | 12/1998 | Albertini et al. ........... 296/37.6 |
| 5,845,954 A | 12/1998 | DePue ..................... 296/37.12 |
| 5,904,389 A | 5/1999 | Vaishnav et al. .......... 296/37.1 |
| 5,921,604 A | 7/1999 | Yu et al. ....................... 296/56 |
| 5,944,376 A | 8/1999 | Buchanan, Jr. .......... 296/146.4 |
| 5,979,973 A | 11/1999 | Clare et al. ................. 296/189 |
| 6,003,923 A | 12/1999 | Scott et al. ................ 296/37.6 |
| 6,102,476 A | 8/2000 | Daley ......................... 296/836 |

\* cited by examiner

VEHICLE WITH STORAGE/UTILITY SYSTEM

This application is a continuation-in-part of U.S. Ser. No. 09/426,981, filed Oct. 26, 1999, which is a continuation of U.S. Ser. No. 08/896,392, filed Jul. 18, 1997, now U.S. Pat. No. 5,979,973, which is a continuation-in-part of U.S. Ser. No. 08/685,678, filed Jul. 24, 1996, now abandoned, which is a continuation-in-part of U.S. Ser. No. 08/506,893, filed Jul. 26, 1995, now U.S. Pat. No. 5,567,000.

BACKGROUND OF THE INVENTION

The present invention relates to pickup trucks, particularly to storage/utility beds for pickup trucks, and more particularly to a storage/utility conversion and method of providing same in a conventional pickup bed without altering the external appearance of the bed.

Pickup trucks have long been a means for transporting and/or storing tools, materials, etc. for various trades, such as plumbing, electrical, construction, repair, etc. While conventional tool boxes, which generally extend across the pickup bed, are a convenient tool storage approach, such take up a great deal of space and thus reduce the carrying capacity. Also, the conventional pickup beds have been removed and replaced with utility type beds of various types, such as exemplified by U.S. Pat. No. 5,267,773 issued Dec. 7, 1993 to G. Kalis, Jr. et al. In addition, the pickup truck body and/or beds have been modified to provide storage/utility space, such as exemplified by U.S. Pat. No. 4,917,430 issued Apr. 17, 1990 to M. A. Lawrence.

While these prior storage/utility arrangements have been satisfactory for their intended purpose, such are an attraction for theft as well as having an appearance of a utility bed. Thus, there has been a need for a storage/utility system for pickup truck beds which does not alter the bed's external appearance or significantly reduce the interior size of the bed, thereby reducing the tool theft problem while providing space for hidden storage without significant reduction of the bed's carrying capacity.

This need has been filled by the present invention which involves the conversion of a conventional pickup truck bed into a storage/utility bed without altering the external appearance of the bed and without significant reduction in the carrying capacity thereof. This is accomplished by providing storage adjacent the wheel well area, and along the length of the bed, and providing the fender/side panel of the bed with a hinge and latch arrangement whereby the fender/side panel can be raised to expose the storage area, or closed and latched to conceal the storage area. Thus, the pickup can be used for pleasure or work without the appearance of its storage/utility capability, and can be parked in areas where theft would likely occur from conventional tool boxes or utility.

SUMMARY OF THE INVENTION

It is an object of the present invention to provide a storage/utility system for conventional pickup truck beds.

A further object of the invention is to provide a method for converting a standard pickup truck bed into a storage/utility bed.

A further object of the invention is to provide a pickup truck bed with storage/utility capability without a significant reduction in the carrying capacity thereof.

Another object of the invention is to provide a pickup bed with storage/utility capability without altering the external appearance of the bed.

Another object of the invention is to provide a pickup bed with a hidden storage/utility system wherein the fender/side panel of the bed is hinged to allow access to the storage/utility area.

Another object of the invention is to reduce theft potential from a storage/utility bed of pickup trucks, etc. by providing hidden storage utility areas in the bed without altering the external appearance of the bed.

Other objects and advantages of the invention will become apparent from the following description and accompanying drawings. The invention involves a storage/utility system for pickup truck beds that can be installed in any fleet side bed without altering the bed's appearance. The storage/utility system is installed in the wheel well area of the bed, and uses hinges to open and close the fender/side panel of the bed. The fender/side panel is provided with a latching and lock mechanism. Since the storage/utility system only involves the area of bed adjacent the wheel wells, it does not significantly reduce the carrying capacity of the bed. By providing a hidden storage/utility system for a pickup truck bed, the potential of theft therefrom is substantially reduced since the unaltered appearance of the bed's external surfaces would not lead one to a realization that it contained tools, etc.

Certain embodiments of the present disclosure may therefore be described as storage/utility systems for a bed adapted to be mounted on wheels and having side panels, including a storage box mounted on at least one side of the bed; at least a portion of a side panel on at least one side of the bed being hinged at an upper portion thereof, whereby the hinged portion can be raised to expose an interior of the storage box and lowered to cover the interior of the storage box; and a lock mechanism mounted to releasably secure the side panel. In the described embodiment, the bed preferably includes a pair of wheel wells, and the storage box covers a wheel well and extends forward and/or rearward from the wheel well.

A preferred storage/utility system has a storage box with a height less than a height of the bed, and in certain embodiments, a lock and latch mechanism is mounted to the storage box and may include a plurality of latch members adapted to cooperate with latch members secured to the side panel. It is also an aspect of the present disclosure that a storage box may be provided with at least one shelf therein. In certain embodiments, a portion of a side panel extends substantially an entire length of the bed, and the storage system is formed by a pair of vertical cuts in the overall side panel of the bed adjacent ends of the overall side panel, and is constructed such that when the side panel is lowered the storage box is hidden and the appearance of the bed is not altered.

In certain embodiments of the disclosure, each side of a bed may be provided with a storage box, a lock and latch mechanism, and a hinged side panel. It is also a preferred embodiment that when each side of a bed includes a storage box, that the storage boxes in the bed are positioned in excess of four (4) feet from each other. Various embodiments of the disclosure would also include the described storage/utility systems in which the beds are mounted over the wheels of a pickup, trailer or truck.

In certain embodiments an invention disclosed herein may be described as a method for converting a conventional bed of a vehicle or trailer having wheel wells and side panels into a storage/utility bed without altering the external appearance of the bed. The method would include removing a section of the side panel on at least one side of the bed; hinging the removed side panel section at an upper end thereof to the bed, whereby the side panel section can be raised and lowered; forming storage means along at least one side of the bed so as to cover the wheel wells, whereby raising of the side panel section exposes the interior of the storage means; and providing latching means for side panel section.

In the practice of the described method, removing a section of the side panel may be carried out by making a pair of vertical cuts through the side panel and removing any connection to the bed of the side panel along the lower end thereof. The removed side panel may be hinged, and in certain embodiments a full length hinge is used. The method may further include providing a latch by positioning a plurality of latch mechanisms along the bed and along the side panel section, and providing the storage means with a latch release mechanism and a lock may also be provided. In certain embodiments the latching mechanism is formed to include a release mechanism, preferably by positioning the release mechanism at the rear of the storage means, and connecting the plurality of latch mechanisms to the release mechanism.

In certain embodiments the described method include providing a storage means, a hinged side panel section, and a latching means on each side of the bed; and positioning the storage means in the bed such that there is a space of about four feet between the storage means, and forming the storage means such that the height thereof is less than the height of the bed. Such methods may further include hinging the side panel section such that the hinge is hidden from a side view of the bed, preparing and painting the storage means and exposed surfaces of the side panel section and adjacent bed surfaces to correspond to the paint of the bed, and/or providing the storage means with internal shelving.

Certain embodiments of the invention may also be described as a method for fabricating a storage/utility bed without altering the external appearance thereof, including forming a bed to include a storage box on each side of the bed extending along substantially the length of the bed; forming hinged side panels on the bed such that same can be opened and closed, to expose or cover the storage boxes, and providing latching and lock means for the side panels.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The present invention involves a storage/utility system for a pickup truck bed and a method for conversion of a conventional pickup truck bed to a storage/utility bed without altering the external appearance of the bed, and without a significant reduction in the carrying capacity of the bed. The present invention reduces the theft potential from storage/utility beds by eliminating the appearance of such beds. The invention utilizes lost space adjacent the wheel wells of the bed while maintaining the space between the wheel wells. As known, the space between the wheel wells of a conventional pickup truck bed is slightly over four (4) feet and the conventional pickup truck beds have a length of eight (8) feet plus, wherein sheets of 8 ft. by 4 ft. material, such as plywood, etc. can be carried between the wheel wells. However, the space in front and back of the wheel well is generally considered lost space for large items until material has been stacked above the height of the wheel wells. Thus, by utilizing the area in front, back, and above the wheel wells as storage/utility space, the overall storage/ carrying capacity of the bed is increased between the outer fender and inner fender of a stock pickup by removing the inner fender. Here, the term storage/utility space is defined as that space in which tools, such as vices, saws, etc. can be stored or mounted for use, and in which shelves can be secured for retaining parts, etc.

Figure 1:
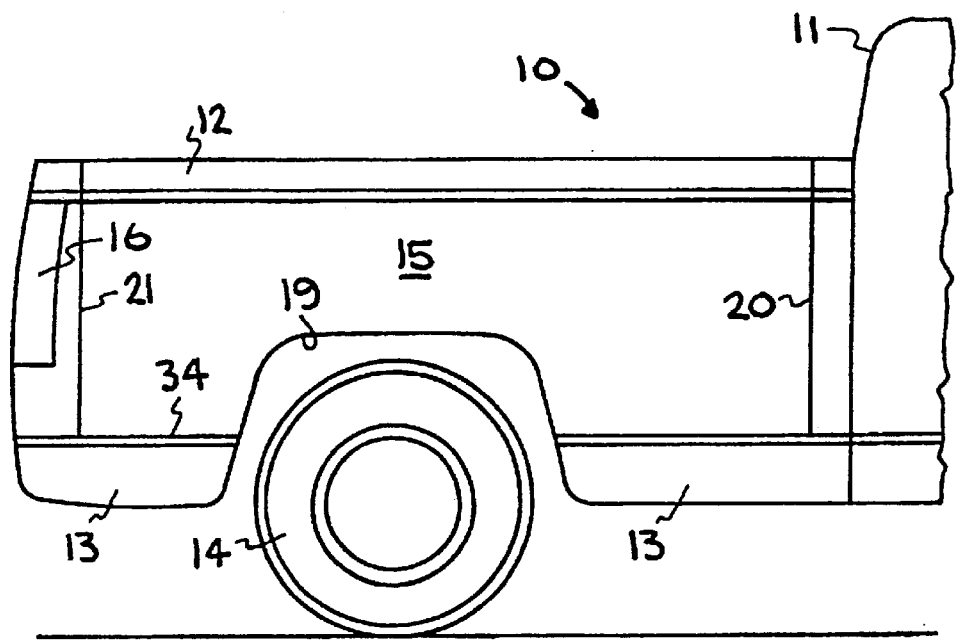
FIG. 1 is a view of a side of a pickup truck bed which has been modified to incorporate the storage/utility system under the closed fender/side panel of the bed in accordance with the present invention.

By the present invention, a conventional pickup truck bed is converted to a storage/utility bed, whereas the conventional installation of storage/utility beds involve the replacement of the conventional bed, thus the cost of conversion compared to the cost of the conventional bed replacement is substantially less. Basically, the conversion involves cutting each fender/side panel (hereinafter called side panel) vertically in two places and along the upper length thereof, on an inner surface of the side panel, as described in detail hereinafter, disconnecting the lower length of the side panels from the bed frame, hinging the side panel along the upper length, providing braces on the side panels, installing a latching mechanism along the lower length of the side panels, providing a key lock for the latching mechanism, installing a storage structure or box over the wheel wells along each side of the bed, securing shelving to the storage box, and painting the cut areas and the storage box to correspond to the color of the bed. Upon completion of the conversion, from a side view, the only difference between the converted bed and a nonconverted bed are two vertical lines or small spaces, one just back of the front of the bed and one just forward of the taillight section of the bed, where the side panel is cut, as illustrated in FIG. 1. The hinge for each side panel is located on an inner area of the side panel so as not to be exposed to one viewing the bed from an external side position. Thus, one would not readily recognize the modification to the bed, and therefore those with intent to steal tools, etc. would not recognize the hidden storage arrangement.

Figure 2:
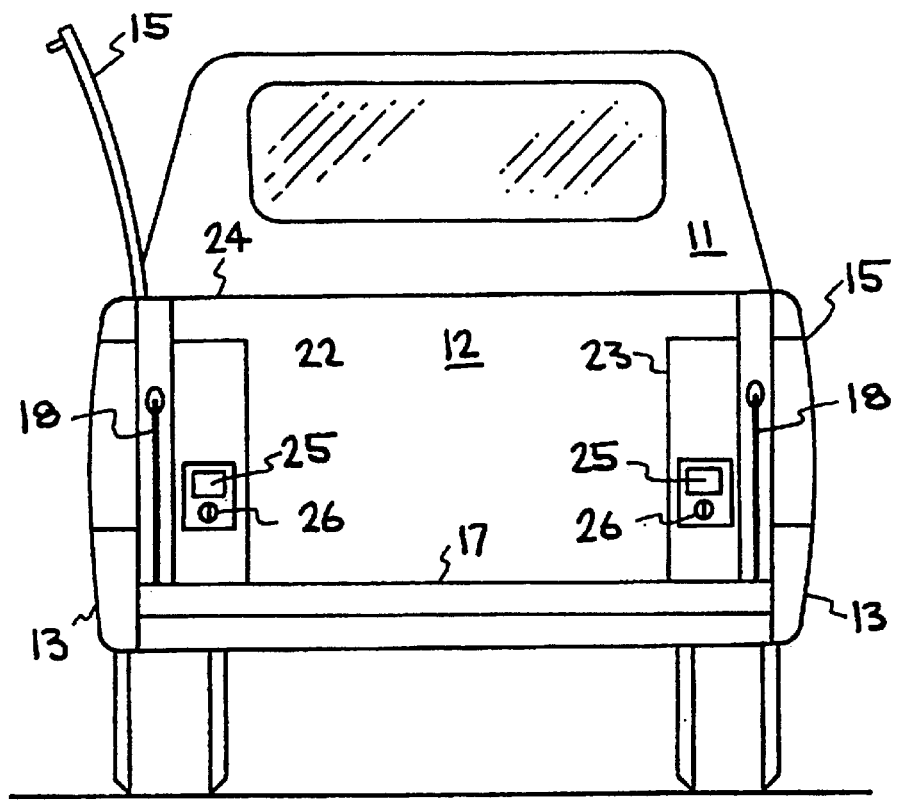
FIG. 2 is an end view of the pickup truck bed of FIG. 1 showing the left fender/side panel open, the right fender/side panel closed, the tail gate open, and the storage boxes and lock mechanism within the bed.

Referring now to the drawings, FIGS. 1 and 2 illustrate a conventionally appearing pickup truck generally indicated at 10 having a cab 11, bed 12, frame or undercarriage 13, and wheels 14. The bed 12 is mounted on frame or undercarriage 13 and includes side panels 15, connected to the cab, a taillight arrangement 16, a hinged tailgate 17 with stop mechanisms 18, and wheel wells 19. However, the bed 12 of FIGS. 1 and 2 has been modified in accordance with the present invention, with the only indication of such modification being the cuts, small spaces, or lines 20 and 21 in the side panels 15, as shown in FIG. 1, with the side panel being closed. Note that in this embodiment the side panels 15 terminate adjacent the frame or undercarriage 13.

Figure 3:
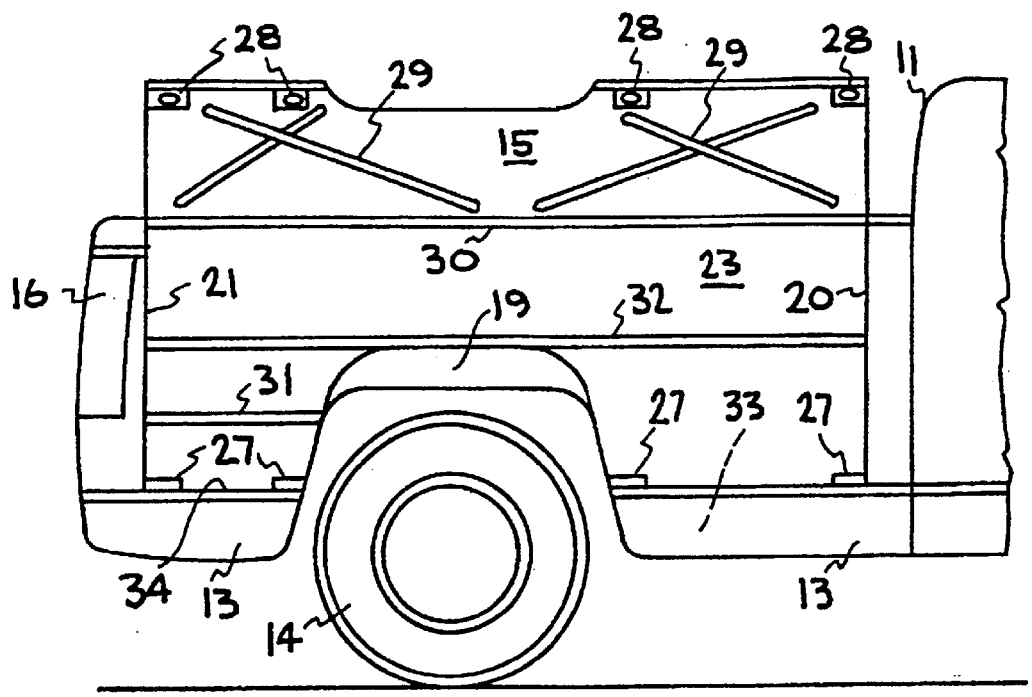
FIG. 3 is a view of an embodiment of the storage/utility system of the FIG. 1 pickup truck bed with the fender/side panel raised to illustrate the storage bin shelves and latch mechanism.
Figure 4:
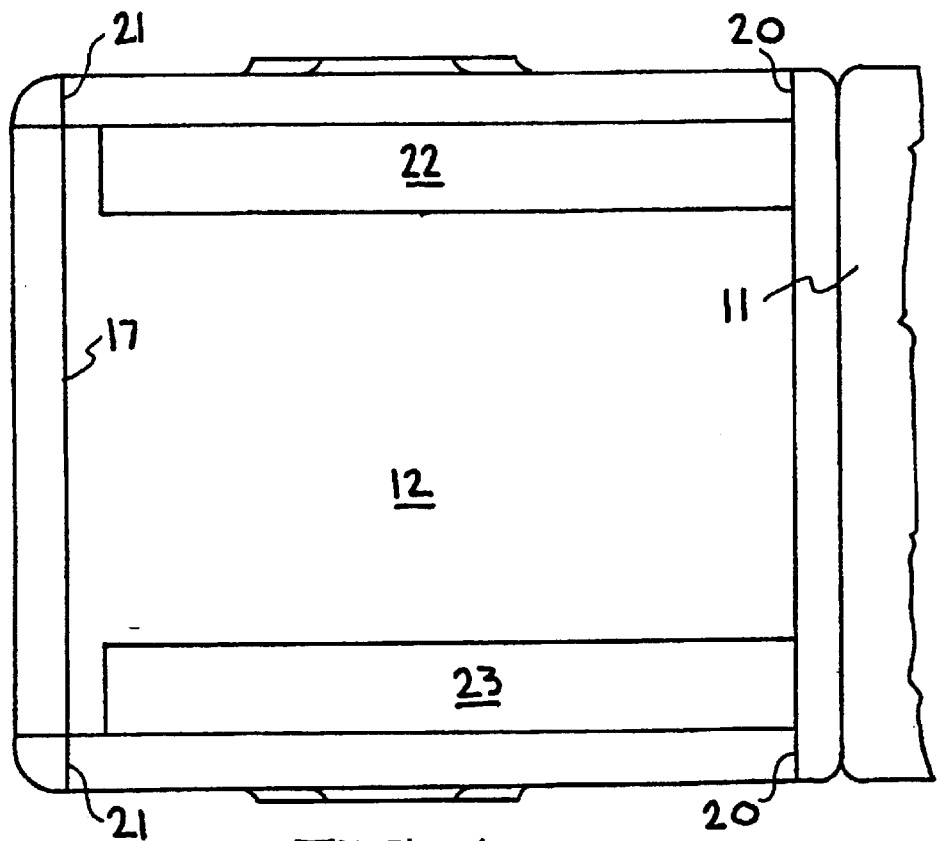
FIG. 4 is a top view of the FIG. 1 pickup truck bed illustrating the storage boxes and fender/side panels, with the tail gate closed.

As seen in FIGS. 2, 3, and 4, the storage/utility area is provided by storage or structure boxes 22 and 23 mounted within the bed 12, substantially centered relative to the width of one of the rear wheels and over the wheel wells 19, the boxes 22 and 23 being constructed to cover the wheel wells 19, but not extend to the top or upper surface 24 of bed 12, and terminate in spaced relation to tailgate 17. The largest horizontal width between side panels 15 of boxes 22 and 23 is not substantially greater than the width of the cab. A latch mechanism 25 is mounted in the rear of each of boxes 22 and 23, as seen in FIG. 2, and is provided with a key lock 26. The latch mechanism 25 includes latch members 27 located in spaced relation along the bed 12, and which cooperate with corresponding latch members 28 in side panel 15, as show in FIG. 3. While not shown, the latch members 27 are interconnected by a rod or cable which is connected to mechanism 25 which includes a release for members 27.

As seen in FIG. 2, the side panels can be contoured such that the distance between the top of one of the side panels and the midline of the bed is less than the distance between the approximate center of the side panels and the midline of the bed. As seen in FIG. 3, the side panels 15 are each provided with braces 29 and a hinge 30 that extends the full length thereof. Shelves 31 and 32 are secured to the interior of storage or structure boxes 22 and 23, and the area forward of the wheel well 19 forms a storage bin 33. The hinges 30 are located on the interior of the bed 12 and thus not visible from the exterior.

It has thus been shown that the present invention provides a hidden storage/utility arrangement that can be initially built into a pickup truck bed, or a conventional bed can be converted to include the storage/utility arrangement without altering the external appearance of the bed and without a significant reduction in the carrying capacity of the bed. While the invention has been described with respect to a pickup bed, it can be readily incorporated into trailer or full-sized truck beds having side panels without detracting from the appearance of the side panels, except for the two vertical cuts therein.

While a specific embodiment of the storage/utility system of the present invention has been described and illustrated, such is not intended to limit the invention to this embodiment. For certain applications only one storage box my be desired. Beds for pickups, trailers, and trucks are designed with differently constructed side panels and frame/ undercarriage arrangements. For example, the bed 12 of FIG. 1 may extend downward to cover the frame or undercarriage 13, as shown, and thus the side panels 15 would include the extended area, or a cut, such as indicated at 34 in FIG. 2, can be made along a desired lower portion of the side panels to eliminate the need for raising the entire side panel when the extended area is part thereof.

Modifications and changes may become apparent to those skilled in the art, and it is intended that the scope of the invention be limited only by the scope of the appended claims.

What is claimed is:

1. A pickup truck having: a cab; a bed with two side panels connected to the cab; at least two rear wheels configured to support the bed; and two wheel wells connected to the bed above the rear wheels, the improvement comprising:
a storage box mounted within the bed and adjacent to one of the wheel wells; and
at least a portion of one of the side panels is hinged to provide access to at least a portion of the storage box wherein the largest horizontal width between the side panels is approximately the width of the cab.

2. The improvement of claim 1, wherein at least a portion of the storage box is located above the wheel well.

3. The improvement of claim 1, wherein at least a portion of the storage box is located in front of the wheel well.

4. The improvement of claim 1, wherein at least a portion of the storage box is located behind the wheel well.

5. The improvement of claim 1, wherein at least a portion of the storage box is located above the wheel well, at least a portion is located in front of the wheel well, and at least a portion is located behind the wheel well.

6. The improvement of claim 1, wherein the storage box is substantially centered relative to the width of one of the rear wheels.

7. The improvement of claim 1, wherein the hinged portion is constructed such that the pickup truck has an external appearance of a conventional pickup truck free of storage box.

8. A pickup truck having: a cab; a bed with two contoured side panels connected to the cab; at least two rear wheels configured to support the bed; and two wheel wells connected to the bed above the rear wheels, the improvement comprising:
at least one storage box adjacent a side panel and substantially aligned in a lateral direction with the center of the wheel well; and
a hinged panel providing access to the storage box.

9. The improvement of claim 8, wherein at least a portion of the storage box is located above the wheel well.

10. The improvement of claim 8, wherein at least a portion of the storage box is located in front of the wheel well.

11. The improvement of claim 8, wherein at least a portion of the storage box is located behind the wheel well.

12. The improvement of claim 8, wherein at least a portion of the storage box is located above the wheel well, at least a portion is located in front of the wheel well, and at least a portion is located behind the wheel well.

13. The improvement of claim 8, wherein the hinged portion is constructed such that the pickup truck has an external appearance of a conventional pickup truck free of storage box.

14. A pickup truck having: a cab with two or more doors, each having an external surface; a bed with two contoured side panels connected to the cab; at least two rear wheels configured to support the bed, and two wheel wells connected to the bed above the rear wheels, the improvement comprising:
at least one storage box adjacent a side panel, wherein the storage box does not substantially extend laterally beyond the exterior surfaces of the doors;
and at least one hinged panel providing access to the storage box.

15. The improvement of claim 14, wherein the exterior surface of the side panel is substantially aligned with an exterior surface of the cab.

16. The improvement of claim 14, wherein at least a portion of the storage box is located above the wheel well.

17. The improvement of claim 14, wherein at least a portion of the storage box is located in front of the wheel well.

18. The improvement of claim 14, wherein at least a portion of the storage box is located behind the wheel well.

19. The improvement of claim 14, wherein at least a portion of the storage box is located above the wheel well, at least a portion is located in front of the wheel well, and at least a portion is located behind the wheel well.

20. The improvement of claim 14, wherein the storage box is substantially centered relative to the width of one of the rear wheels.

21. The improvement of claim 14, wherein the hinged portion is constructed such that the pickup truck has an external appearance of a conventional pickup truck free of storage box.

22. A pickup truck having: a cab; a bed connected to the cab; two side panels connected to the bed, each side panel having a top, a bottom, and an approximate center; and two wheel wells adjacent to the side panels and connected to the bed wherein the side panels are disposed approximately equidistant from a midline of the bed, the improvement comprising:
  a storage box, wherein the storage box is connected to the bed and adjacent to one of the side panels;
  at least a portion of the adjacent side panel is hinged to provide access to the storage box; and,
  wherein the side panels are contoured such that the distance between the top of one of the side panels and the midline of the bed is less than the distance between the approximate center of the side panels and the midline of the bed.

23. The improvement of claim 22, wherein at least a portion of the storage box is located above the wheel well.

24. The improvement of claim 22, wherein at least a portion of the storage box is located in front of the wheel well.

25. The improvement of claim 22, wherein at least a portion of the storage box is located behind the wheel well.

26. The improvement of claim 22, wherein at least a portion of the storage box is located above the wheel well, at least a portion is located in front of the wheel well, and at least a portion is located behind the wheel well.

27. The improvement of claim 22, wherein the storage box is substantially centered relative to the width of one of the rear wheels.

28. The improvement of claim 22, wherein the hinged portion is constructed such that the pickup truck has an external appearance of a conventional pickup truck free of storage box.

29. A vehicle with a bed comprising:
  at least two rear wheels configured to support the bed;
  a pair of contoured side panels over the rear wheels and connected to the bed; and
  a storage box mounted within the bed and adjacent to at least one of the side panels;
  wherein at least a portion of at least one of the side panels is hinged to provide access to at least a portion of the storage box.

30. The vehicle of claim 29, wherein the vehicle is a pickup truck.

31. The vehicle of claim 29, wherein the vehicle further comprises a passenger area comprising seats.

32. The vehicle of claim 29, wherein the storage box is substantially centered relative to the width of one of the rear wheels.

33. A vehicle comprising:
  a passenger cabin;
  a cargo area defined by a pair of side panels and located behind the cabin;
  at least two rear wheels configured to support the cargo area; and
  a storage box mounted within the cargo area and adjacent to the side panels wherein the horizontal width of the cargo area is not substantially greater than the width of the passenger cabin.

34. The vehicle of claim 33, wherein the vehicle is a pickup truck and the cabin is a cab.

35. The vehicle of claim 33, wherein the cabin comprises a driver's seat and a front passenger seat.

36. The vehicle of claim 33, wherein the storage box is substantially centered relative to the width of one of the rear wheels.

37. The vehicle of claim 33, wherein the side panels are contoured.

38. The improvement of claim 1 wherein the side panels are contoured.

39. A pickup truck having: a cab; a bed with two side panels connected to the cab and mounted on a frame; at least two rear wheels configured to support the bed; and two wheel wells connected to the bed above the rear wheels, the improvement comprising:
  a storage compartment mounted within the bed and adjacent to one of the wheel wells; and
  at least a portion of one of the side panels is hinged to provide access to at least a portion of the storage compartment wherein the side panels terminate adjacent the frame.

40. The truck of claim 39, wherein the storage compartment is substantially centered relative to the width of one of the rear wheels.

41. The truck of claim 40 wherein the side panels are substantially aligned with the cab.

42. The truck of claim 39 wherein an outer side of the storage compartment is contoured.

43. The truck of claim 42 wherein the contoured outer side of the storage compartment is substantially aligned with the cab.

44. The truck of claim 39 which further comprises a second storage compartment mounted within the bed and adjacent to a second wheel well.

45. The truck of claim 44 wherein the first and second storage compartments are formed by contoured side panels connected to the cab wherein at least a portion of said side panels are hinged to provide access to at least a portion of said storage compartments.

46. The truck of claim 45 wherein the hinged portion is constructed such that the truck has an external appearance of a conventional pickup truck.

47. The truck of claim 45 wherein the storage compartments are positioned in excess of about four feet from each other.

48. The truck of claim 39 wherein the bed has a length of at least about eight feet.

49. A pickup truck comprising:
  a cab;
  a bed located behind the cab wherein said bed has two contoured side panels connected to the cab and defining a cargo area wherein said cargo area has a horizontal width which is not substantially greater than the width of the cab;
  at least two rear wheels configured to support the bed;
  two wheel wells connected to the bed above the rear wheels; and
  a storage box comprising multiple compartments wherein said storage box is mounted within the bed and adjacent to one of the wheel wells, wherein a substantial portion of the two side panels is hinged to provide access to the compartments of the storage box, and wherein the storage box is substantially centered relative to the width of one of the rear wheels.

50. The truck of claim 49 wherein the hinges are hidden from a side view of the bed.

* * * * *